March 20, 1956     F. T. JOHN     2,739,304
INDICATING DEVICE

Filed April 5, 1952     3 Sheets-Sheet 1

INVENTOR.
FRANK T. JOHN
BY
Brown, Critchlow, Flick & Peckham
HIS ATTORNEYS

March 20, 1956  F. T. JOHN  2,739,304
INDICATING DEVICE
Filed April 5, 1952  3 Sheets-Sheet 2

INVENTOR.
FRANK T. JOHN
BY
Brown, Critchlow, Flick & Peckham
His ATTORNEYS

March 20, 1956 F. T. JOHN 2,739,304
INDICATING DEVICE
Filed April 5, 1952 3 Sheets-Sheet 3

INVENTOR.
FRANK T. JOHN
BY
Brown, Critchlow, Flick & Peckham
HIS ATTORNEYS

United States Patent Office 2,739,304
Patented Mar. 20, 1956

2,739,304

INDICATING DEVICE

Frank T. John, State College, Pa., assignor, by mesne assignments, to Research Corporation, New York, N. Y., a corporation of New York Application April 5, 1952, Serial No. 280,797

8 Claims. (Cl. 340—318)

This invention relates to an indicating device for visually displaying any desired number of symbols in succession, as for example, the numerical output of computers, counters, etc., or the alphabetic output of various communication devices.

It is among the principal objects of this invention to provide an indicating device of the foregoing type that will operate with extreme rapidity in response to electrical input data inserted in the apparatus from an external source.

Further objects are to provide such an indicating device that is characterized by the simplicity of its operating parts and mode of operation, and that is adapted to synthesize a large number of possible symbols from a relatively small number of component symbol parts.

Figure 1:
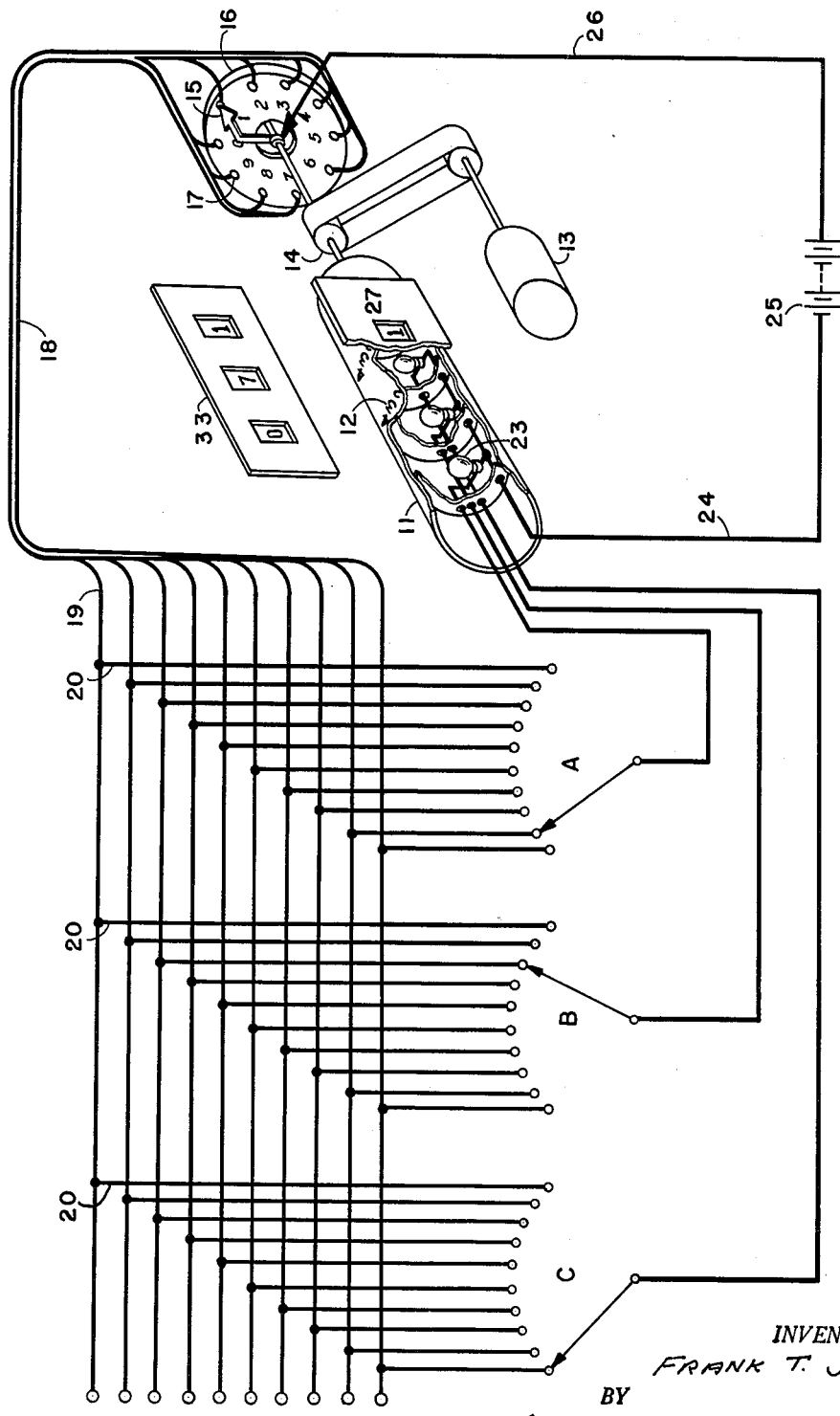
Figure 2:
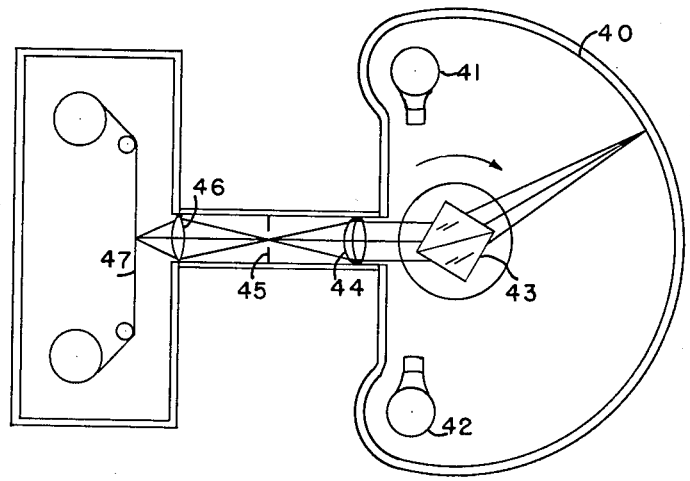
Figure 3:
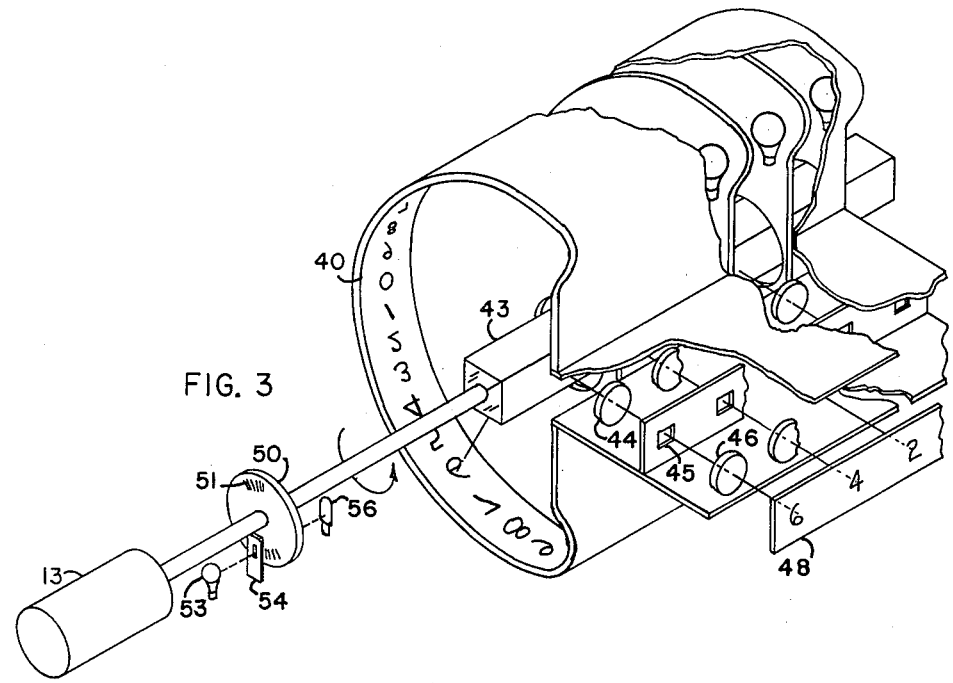
Figure 4:
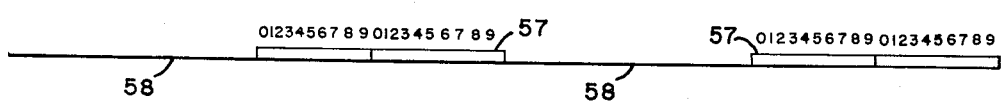
Figure 5:
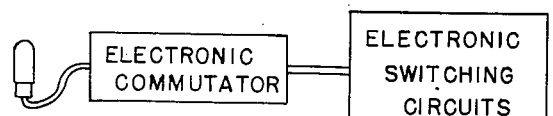
Figure 6:
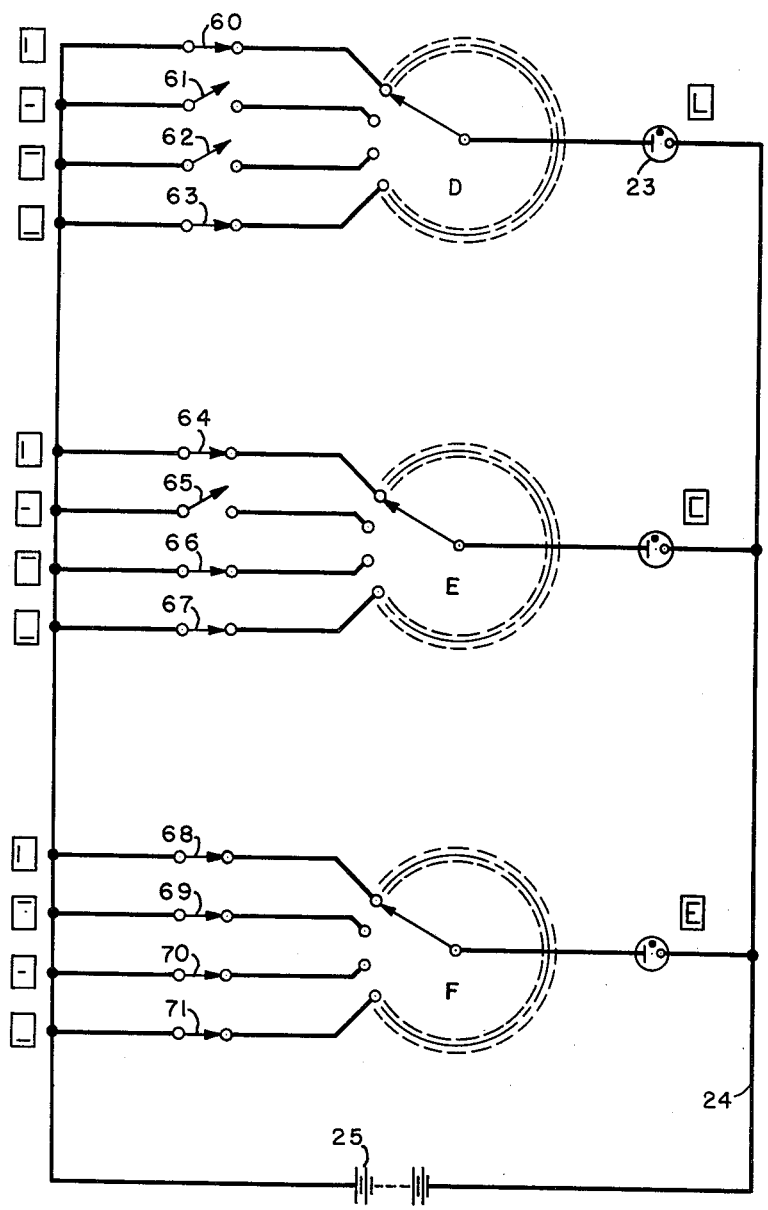

Other objects and uses of the invention will be apparent from the following description, in which reference is made to the attached drawings, wherein Fig. 1 is an isometric view, partly in section, of a preferred embodiment of this invention; Fig. 2 is a partial diagrammatic view of a modified form of the invention; Fig. 3 is a partial isometric view, partly in section, incorporating the modification of Fig. 2; Fig. 4 is a line chart, illustrating the timing sequences involved in the operation of the device; Fig. 5 is a diagrammatic view of an electronic form of commutator and switching circuit, and Fig. 6 is a circuit diagram illustrating the circuit connections for synthesizing whole symbols from component parts of those symbols.

In accordance with this invention, use is made of stroboscopic principles to cause particular symbols, which are located on a rapidly moving and recycling field of symbols (or the moving and recycling image of a stationary field of symbols), to appear stationary and to stand out distinctly to the exclusion of all other symbols in that field. In the way of general description, the indicating device includes an oscillating or rotating member, which may be a disc or cylinder or a portion of each of those, bearing a series of symbols, such as numbered digits that are adapted to be made selectively visible by brief flashes of light. The mechanical movement of the member is such that each symbol thereon repeats its position in space in regular order and at regular intervals. In a preferred form of this device, shown in Fig. 1, a hollow translucent cylinder 11 is provided with three spaced circumferential symbol bands 12, each band including opaque digit numerals from zero to nine, which are printed on, or otherwise affixed to, the surface of the cylinder. Inside the cylinder in partitioned cells are mounted a plurality of flashing light sources, such as neon lamps 23, which produce a brief flash when an energized circuit is closed. Each lamp is adapted to flash at selective periodic intervals, as controlled by appropriate electrical circuits to be described below, illuminating one of the symbols in one or more symbol bands on the surface of the rotating cylinder, when the desired symbol is in line with a viewing window. Those illuminations are repeated so rapidly, that the motion of the cylinder appears to be frozen and the desired symbol appears to be stationary.

The cylinder 11 is rapidly rotated by a motor 13 through a pulley 14 mounted on the same shaft as the cylinder. There is also mounted on that shaft, and rotated in synchronism with the cylinder, a commutator contact wiper arm 15, associated with a stationary commutator 16. The latter contains a plurality of contacts (here there are ten), each contact corresponding to one of the digit symbols in each band on the surface of cylinder 11. A separate conductor is connected to each of the contacts 17, and those conductors are bundled together in a cable 18, which is connected to the network circuit shown in Fig. 1.

In that network each of the ten conductors is connected to a separate terminal 19 corresponding to one of the digits from zero to nine. Each conductor is likewise connected by leads 20 to a separate contact in each of three multiple contact switches A, B and C, the wiper arms of those three switches are each connected to a terminal of a different flash lamp 23, which may be a neon lamp, or an equivalent source of brief flashes of light. The other terminal of each lamp is connected by a common conductor 24 to one side of a power supply, represented by a battery 25, the other side of which is connected to the commutator contact wiper arm 15, through a conductor 26.

According to the convention used in this application, selector switches A, B, and C control flash lamps indicating hundreds, tens, and units digits, respectively. It will be apparent from the circuit connections between the commutator 16 and the selector switches A, B and C, that whenever the wiper arms of those switches engage their extreme lefthand contacts, representing the digit zero, each of the flash lamps will receive a pulse of current and flash very briefly at the moment that the row of zero digits on the surface of cylinder 11 is framed by a viewing window 27. Similarly, when the wiper arm of any one of the selector switches engages another contact, for example, that connected to terminal 7 on the lefthand side of Fig. 1, then the flash lamp controlled by that switch will light when the numeral 7 on the cylinder is framed by its viewing window. From the setting of the selector switches in Fig. 1, it will be apparent that the numerals that will appear in the viewing windows will be 071, as shown by the window plate 33.

In Figs. 2 and 3 there is shown a modified form of the invention, wherein the rotating cylinder 11 of Fig. 1 is replaced by a stationary member 40. On the inner arcuate surface of this member, the desired symbols are arranged in a plurality of spaced strips, one of which is visible in Fig. 3. Each strip of symbols is in a separate partitioned cell that is illuminated by two flash lamps 41 and 42. Those lamps may be connected to the lamp control circuits shown in Fig. 1 or to an electronic control circuit to be described. The stationary field of symbols is scanned by a rotating dove prism 43, which transfers the instantaneous image of a particular symbol, when the flash lamps are lighted, through a lens 44, a field stop 45, and a second lens 46, onto a moving photographic film 47 (as shown in Fig. 2), or on a viewing screen 48 (as shown in Fig. 3). Since the dove prism 43 is rotated in synchronism with a commutator, like that in Fig. 1, and is controlled by similar control circuits, it will be apparent that the devices of Figs. 1, 2 and 3 operate on the same principles although they differ in the way in which the field of symbols is scanned.

There is also shown in Fig. 3, an opaque pulsing disc 50, provided with a plurality of radially extending slits 51, and rotated in synchronism with the prism 43. A source of light 53 mounted on one side of an aperture plate 54 adjacent to the pulsing disc 50, transmits light through the slits 51 to a phototube 56 mounted on the other side of the disc. Accordingly, the phototube may be used to transmit pulses of current to an electronic counter which can thereby be adapted to act as a commutator in place of the commutator described in Fig. 1. The pulses produced by the electronic commutator are then transmitted to electronic switching circuits performing a function similar to those of selector switches A, B, and C in Fig. 1, that is, to close selective circuits for timing the light flashes that are used to display a given symbol. A diagrammatic view of the circuit connections of such electronic commutator and switching apparatus is shown in Fig. 5.

Fig. 4 represents a time scale of the scanning cycles resulting from the operation of the rotating dove prism shown in Figs. 2 and 3. During each complete rotation of that prism, the field of symbols on the surface of stationary member 40 is scanned twice. Each scanning period is represented by a block 57, successive periods being separated by a non-scanning interval, measured by the length of a line 58, which is approximately equal to the duration of the scanning cycle. This scanning operation is characteristic of a dove prism. The symbol sequence may be repeated as often as desired in each band of symbols on the stationary surface 40, thereby increasing the number of scannings per second without increasing the speed of rotation of the prism. In Fig. 3 and Fig. 4, the sequence of symbols appears twice during each scanning period.

In Fig. 6 is shown a modified version of the switching and commutating circuit of Fig. 1 to provide for the selective illumination of component parts of various symbols in rapid succession, so that the human eye will see, or a photographic film will record, a composite or synthesized whole symbol.

Commutator 16 and selector switches A, B and C shown in Fig. 1 are replaced in Fig. 6 by three rotary commutators D, E and F and by their associated symbol component selector switches 60 to 71, inclusive. As in Fig. 1, one terminal of each flash lamp 23 is connected to a battery 25 by a common conductor 24, and the other terminal of each lamp is connected to a wiper arm of one of the rotary switches D, E or F. Next to the lamp controlled by rotary switch D is a symbol "L," which represents the combination of the two component symbol parts shown at the left side of Fig. 6 that are illuminated by that lamp when selector switches 60 and 63 are closed, as they are shown to be in Fig. 6. Each of these component symbol parts will appear once in the viewing window for each revolution of the wiper arm of switch D. However, that arm revolves so rapidly that the parts appear to the eye in the form of the combined whole symbol as shown next to lamp 23.

A particular advantage of the modification shown in Fig. 6, is that a large number of composite symbols may be displayed, either for observation or recording, from a relatively small number of component symbol parts that are recycled either in a small field of such symbol parts, or in a large field in which those parts are repeated two or more times in the same sequence.

It will be understood that while the circuits shown in Figs. 1 and 6 contain mechanical commutators and mechanical switches, their electronic equivalents may be substituted without departing from the spirit or scope of this invention.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An indicating device for projecting a visual symbol image in response to selective input data, comprising a stationary field of symbols distributed circumferentially on a concave arcuate surface, a light source acting as the sole illumination of the symbol field and adapted to flash periodically at predetermined intervals and to illuminate the entire symbol field during each flash, a prism mounted in scanning relation to the symbol field with its axis of rotation coinciding with the axis of curvature of the arcuate surface, means for rapidly and continuously rotating the prism, an optical system for projecting symbol images transmitted by the prism, and synchronizing means controlled by the input data for causing the light source to flash briefly and periodically whenever the rotating prism is in a predetermined angular position for scanning a desired symbol and transmitting its image through the optical system.

2. An indicating device in accordance with claim 1, in which the prism is a dove prism and in which the symbol field contains two sets of identical symbols, the symbols of the second set following those of the first set and arranged in the same sequence.

3. An indicating device in accordance with claim 1, in which the synchronizing means includes an opaque pulsing disc provided with a plurality of radially extending slits, means for rotating the disc in synchronization with the prism, a constant light source mounted on one side of the pulsing disc, a photoelectric cell mounted on the other side of the disc for receiving light pulses from the constant light source through the slits of the disc as that disc rotates, an electronic counter connected to the photoelectric cell for counting said light pulses to determine the angular position of the prism at the instant of any given pulse.

4. An indicating device of the stroboscopic type for projecting a visual symbol image in response to selective input data, comprising a light-tight chamber provided with a concave arcuate surface, a field of symbols arranged circumferentially on that surface, a light source within the chamber adapted to flash periodically at predetermined intervals to illuminate the entire symbol field, a prism rotatably mounted within the chamber in scanning relation to the symbol field with its axis of rotation coinciding with the axis of curvature of the arcuate surface, means for rapidly and continuously rotating the prism, a tube mounted on a side of the chamber opposite the symbol field with its longitudinal axis intersecting the rotational axis of the prism, an optical system within the tube for projecting outside of the chamber the symbol images transmitted by the prism, and synchronizing means controlled by the input data for selectively causing the light source to flash briefly and periodically whenever the rotating prism momentarily occupies an angular position that will transmit through the optical system the image of a particular symbol in the symbol field.

5. An indicating device in accordance with claim 4, in which the chamber has a substantially semi-circular cross-section and in which the field of symbols is displayed circumferentially on the inner circular arcuate surface of the chamber and covers substantially 180° of that surface.

6. An indicating device in accordance with claim 4, in which the prism is a dove prism and in which the symbol field contains two sets of identical symbols, the symbols of the second set following those of the first set and arranged in the same sequence.

7. An indicating device according to claim 6, in which the rotational axis of the dove prism coincides with the longitudinal axis of the prism.

8. An indicating device in accordance with claim 4, in which the synchronizing means includes an opaque pulsing disc provided with a plurality of radially extending slits, means for rotating the disc in synchronization with the prism, a constant light source mounted on one side of the pulsing disc, a photoelectric cell mounted on the other side of the disc for receiving light pulses from the constant light source through the slits of the disc as that disc rotates, an electronic counter connected to the photoelectric cell for counting said light pulses to determine the angular position of the prism at the instant of any given pulse.

References Cited in the file of this patent

UNITED STATES PATENTS

| | | |
|---|---|---|
| 1,933,650 | Bascom | Nov. 7, 1933 |
| 1,967,892 | Leibing | July 24, 1934 |
| 2,086,391 | Poole | July 6, 1937 |
| 2,257,763 | Petterson | Oct. 7, 1941 |
| 2,278,993 | Johnson | Apr. 7, 1942 |
| 2,432,454 | Skellett | Dec. 9, 1947 |
| 2,440,797 | Clough | May 4, 1948 |
| 2,477,821 | Potts | Aug. 2, 1949 |
| 2,600,168 | Klyce | June 10, 1952 |
| 2,633,297 | Quinby | Mar. 31, 1953 |